United States Patent
Wilson

[11] 4,216,697
[45] Aug. 12, 1980

[54] TWO-PIECE REUSABLE FASTENER

[76] Inventor: Leroy Wilson, P.O. Box 203, Manhattan, Kans. 66502

[21] Appl. No.: 968,778

[22] Filed: Dec. 12, 1978

[51] Int. Cl.³ .............................................. F16B 13/06
[52] U.S. Cl. ............................................................ 85/70
[58] Field of Search ........................... 85/70, 71, 5 R; 215/361, 359, 360, 358; 24/217 R, 216

[56] References Cited

U.S. PATENT DOCUMENTS

| 3,534,936 | 10/1970 | Knowlton | 85/70 X |
| 3,910,155 | 10/1975 | Wilson | 85/70 |

FOREIGN PATENT DOCUMENTS 188489  1/1957  Austria .......................................... 85/70
1157101 11/1963 Fed. Rep. of Germany ........... 215/361

*Primary Examiner*—Ramon S. Britts
*Attorney, Agent, or Firm*—Berman, Aisenberg & Platt

[57] ABSTRACT

A two-piece plastic fastener or rivet which comprises an anchor member having a shank portion and an enlarged head through both of which is formed an axial bore. A locking plug is disposed within the bore. The locking plug includes enlarged heads formed at both ends thereof, one of which secures the plug within the bore of the anchor, the other of which is adapted to project beyond the retaining head of the anchor when the plug is moved axially in the bore. Upon such movement, which may be effected with the aid of a separate tool, the free end of the shank is bulged outwardly so as to abut the other surface of the workpiece.

1 Claim, 5 Drawing Figures

U.S. Patent  Aug. 12, 1980  4,216,697
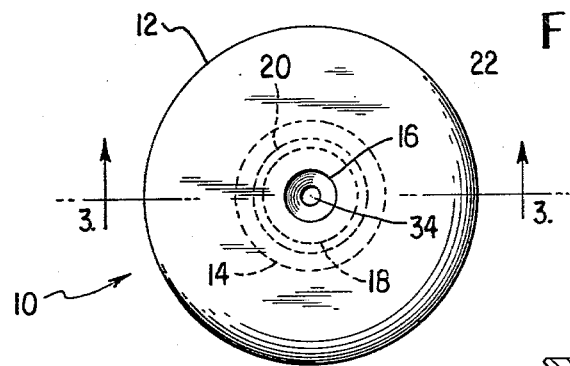
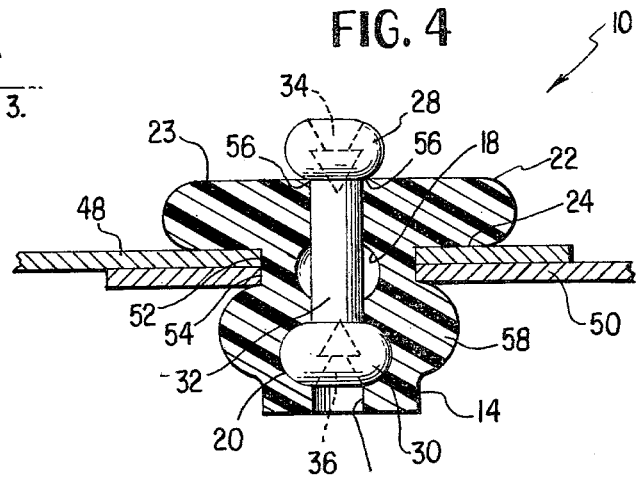
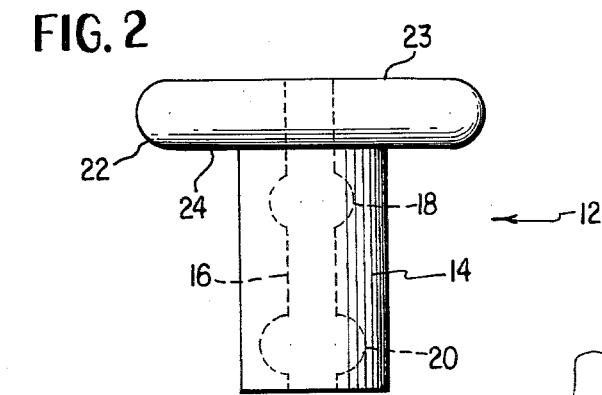
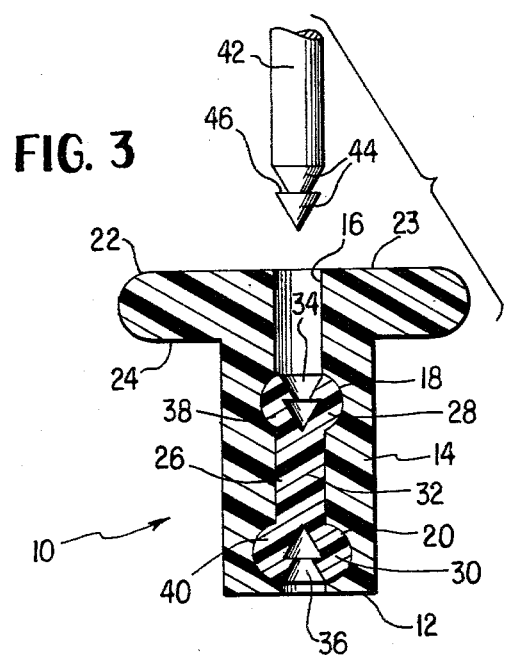
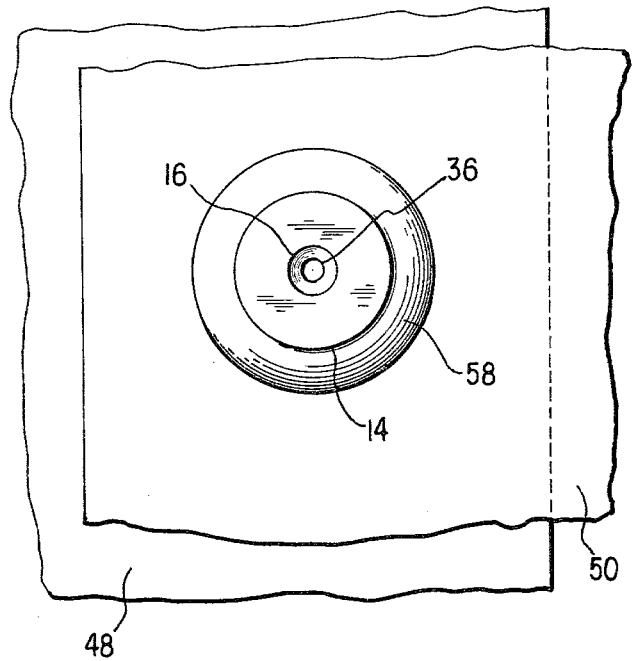

TWO-PIECE REUSABLE FASTENER

BACKGROUND OF THE INVENTION

1. Field of the Invention

The present invention relates to a fastening assembly for securely holding apertured parts together and, more particularly, is directed to a two-piece fastening assembly which includes a relatively resilient female anchoring element and a relatively rigid male locking element.

2. Description of the Prior Art

The present invention is an improvement upon my earlier fastener described in U.S. Pat. No. 3,910,155, issued Oct. 7, 1975.

In my earlier patent, I point out the disadvantages of conventional hard metal fasteners, and offer an alternate construction which utilizes a relatively resilient female member within which is positioned a relatively rigid male member, both members being preferably formed of natural or synthetic materials other than metal.

While being an improvement over the prior art fasteners theretofore known, I have found my prior design to suffer from several deficiencies, and it is towards remedying these deficiencies that the present invention is advanced.

One of the disadvantages of my prior design relates, for example, to the difficulty in reusing the fastener. It would naturally be highly desirable if such fastening elements could be readily reused, both from an economic standpoint and from the standpoint of facilitating removal and dismantling of an apparatus to save labor.

My prior art structure also consists of two separate pieces which had to be individually stored and did not form any cooperating function until assembly of the apertured members. It would clearly be desirable to be able to provide a substantially unitary construction for the purposes both of facilitating storage and inventory, as well as installation and use. As will be pointed out in greater detail hereinbelow, even though the present invention is constructed of two distinct cooperating members, such members may be stored and utilized as a single unit.

Another deficiency of my prior design is that it requires access to both sides of the panel members within which the fastener is desired to be installed, a design which is obviously limited to those physical situations where access to both sides of the panels is readily available. It would clearly be desirable if a fastener could be provided that could be installed and removed from only one side of the fastenable members.

It is towards solving the above-noted deficiencies of my prior art that the present invention is advanced.

Other United States patents in this general art area of which I am aware include: U.S. Pat. Nos. Re. 24,438; 2,061,629; 2,800,526; 3,358,550; 3,489,312; and 3,534,936.

OBJECTS AND SUMMARY OF THE INVENTION

It is therefore a primary object of the present invention to provide a two-piece reusable fastener which overcomes all of the deficiencies noted above with respect to prior art devices.

Another object of the present invention is to provide a fastening element which is readily, simply, and easily reusable.

A Further object of the present invention is to provide a two-piece reusable fastener which forms a substantially unitary assembly during storage and use, even though it is comprised of two distinct parts.

A still further object of the present invention is to provide a fastening element of the character described which requires access to only a single side of a pair of panel members desired to be fastened together, both for assembly and disassembly thereof, but which may, at the same time, be disassembled from either side of the panel members.

A still further object of the present invention is to provide a two-piece reusable fastener assembly which is simple in construction, may be readily mass produced, and is therefore inexpensive and economical.

The foregoing and other objects are attained in accordance with one aspect of the present invention through the provision of a two-piece reusable fastener, which comprises an anchor having an elongated flexible shank adapted to fit through aligned apertures formed respectively in two members which are to be fastened together. The anchor includes an enlarged retaining head formed on one end of the shank and a bore which extends longitudinally through both the retaining head and the shank. Means are disposed wholly within the bore and are adapted to be moved in a first direction therein for locking the anchor on both sides of the members and in a second direction therein for unlocking and thereby releasing the anchor from the members.

In accordance with more specific aspects of the present invention, the recited means comprises a locking member having a central, substantially cylindrical portion of approximately the same diameter as that of the bore in the anchor. The locking member further includes a first enlarged head formed at one end of its central portion and a second enlarged head formed at the other end of the central portion. More particularly, the second head is larger in diameter than the first head and is positioned within the bore at the end thereof opposite that at which the retaining head is formed. A portion of the bore in the shank is shaped the same as that of the locking member so as to house same therein in the unfastened state of the fastener.

In accordance with another aspect of the present invention, one or both of the first and second enlarged heads may include means engagable by a separate tool for moving the locking member in the bore. In a preferred embodiment, the means engagable by a tool comprises a double conical female recess which defines a shoulder for releasable engagement with a male tool that is shaped substantially the same as the recess.

In accordance with still further aspects of the present invention, the second enlarged head of the locking member is sized to remain in its initial position within the bore as the locking member is moved towards the retaining head, thereby causing the opposite end of the shank to bulge outwardly. The first enlarged head is adapted to be positioned outside the retaining head of the anchor member in the locked position of the fastener.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a top view of a preferred embodiment of the present invention;

FIG. 2 is a side view in elevation of one of the components of the preferred embodiment of the present invention;

FIG. 3 is a longitudinal sectional view of the preferred embodiment illustrated in FIG. 1 and taken along line 3—3 thereof, and also illustrates a tool which may be utilized with the present invention;

FIG. 4 illustrates the preferred embodiment of the present invention when installed; and FIG. 5 is a bottom view of the installation of the present invention illustrated in FIG. 4.

DETAILED DESCRIPTION OF THE PREFERRED EMBODIMENT

Referring now to the drawings, wherein like reference numerals represent identical or corresponding parts throughout the several views, and more particularly to FIGS. 1 and 3, the two-piece reusable fastener or rivet of the present invention is indicated generally by reference numeral 10 in top and sectional views, respectively.

The fastener 10 comprises a first piece or anchor member which is indicated generally by reference numeral 12 and is shown in a side plan view in FIG. 2. Anchor member 12 is preferably formed of a strong deformable substance such as rubber, nylon, elastomeric plastic, or a similar synthetic product possessing adequate strength and resiliency. Anchor member 12 includes an elongated shank portion 14 which has a constant fixed outer diameter in repose. Extending outwardly from the top end of shank 14 is a retaining head 22 which is of a diameter larger than that of shank 14 and which includes a preferably planer top surface 23 and a preferably planar under surface 24.

A longitudinal bore 16 extends through both shank 14 and head 22 and is of substantially uniform diameter with the exception of the formation of a pair of increased diameter annuluses 18 and 20. For a purpose which will become evident below, the upper annulus 18 is preferably somewhat smaller than the lower annulus 20.

Referring again to FIGS. 1 and 3, the anchor member 12 is shown in combination with the second piece or locking plug 26 which, prior to installation, is wholly disposed within bore 16 of shank 14. The locking plug 26 is also preferably formed of a somewhat flexible but relatively rigid material, perhaps of an elastomeric plastic which is harder and somewhat less resilient than the material from which anchor member 12 is formed.

The locking plug 26 is comprised of a central cylindrical portion 32 which is of substantially the same diameter as that of bore 16 within which it is disposed. A pair of enlarged heads 28 and 30 are formed at each end of center portion 32 and are sized so as to substantially fill the cavities 18 and 20 of shank 14, respectively. More particularly, the lower enlarged head 30 is somewhat larger than the upper enlarged head 28 so as to readily remain within annulus 20 upon movement of the locking plug 26, for reasons which will become more clear hereinafter.

The locking plug 26 is preferably provided with means for moving same within bore 16. Such means are indicated in FIG. 3 by reference numerals 34 and 36 and may comprise, in one embodiment, a double conical recess extending inwardly from the ends of heads 28 and 30. The double conical recesses 34 and 36 form catches or locking shoulders 38 and 40, respectively, to permit grasping thereof by a suitable tool 42.

As illustrated in FIG. 3, an insertion and removal tool 42 includes a double conical tip 44 which also defines a shoulder 46. The tool 42 is constructed of a hard, rigid material such as a metal or a strong synthetic so as to be readily insertable within recesses 34 and 36 so that shoulder 46 may engage shoulders 38 or 40 to push or pull locking plug 26, as may be desired.

FIGS. 4 and 5 illustrate the fastener 10 of the present invention as installed through a pair of pre-formed aligned apertures 52 and 54 in two sheets of material 48 and 50. The diameter of the apertures 52 and 54 is preferably closely aligned with the diameter of shank 14 of fastener 10.

In use, the anchor member 12 with locking plug 26 in place as illustrated in FIG. 3 is placed through apertures 52 and 54 until the lower surface 24 of retaining head 22 abuts the upper surface of panel 48. The tool 42 is then inserted into bore 16 until it engages the double concial recess 34 of head 28. Due to the more resilient nature of the material of plug 26 compared with tool 42, the shoulder 46 of double conical tip 44 will engage the catch 38 of enlarged head 28 to permit same to be pulled upwardly through bore 16. Due to its relatively small diameter, head 28 of locking plug 26 will readily be removed from annulus 18 in bore 16, while the lower head 30, due to its relatively large size, will be retained in the lower annulus 20 and will therefore carry the lower portion of shank 14 upwardly therewith. When upper head 28 of locking plug 26 has been pulled upwardly a sufficient distance to clear the upper surface 23 of retaining head 22, the fastener 10 will be in its full locked position illustrated in FIG. 4 wherein the lower surface 56 of head 28 prevents plug 26 from moving back within bore 16. The same locked position can be achieved, of course, by inserting tool 42 into catch 40 of annulus 30 and pushing locking plug 26 upwardly as viewed in FIG. 3.

During the upward movement of locking plug 26, it may be necessary to retain the head 22 against surface 48 by, for example, placing a finger against the top surface 23, or by using a suitably modified tool 42. Clearly, the retention of lower enlarged head 30 in lower annulus 20 and upward movement of plug 26 results in a bulged portion 58 being formed in shank 14 to secure the fastener 10 in the position illustrated in FIG. 4.

In order to release the fastener 10 from members 48 and 50, locking tool 42 may either be inserted into double conical recess 34 so as to push locking plug 26 downwardly, or it may be inserted into double conical recess 36 to pull plug 26 downwardly. Thus, while access to only one side of the panel assembly 48 and 50 is necessary for installation of the fastener 10, access to either side may be used to remove the fastener 10. It may also be appreciated that the fastener 10 of the present invention is readily reusable, and forms, as is illustrated in FIG. 3, a substantially unitary assembly during storage, even though it consists of two separate and distinct pieces.

Obviously, numerous modifications and variations of the present invention are possible in light of the above teachings. It is therefore to be understood that within the scope of the appended claims, the invention may be practiced otherwise than as specifically described herein.

I claim as my invention:

1. A two-piece reusable fastener, which comprises:

an anchor having an elongated flexible shank adapted to fit through aligned apertures formed respectively in two members which are to be fastened together, the shank having two ends, one of which comprises an enlarged retaining head, and an axial bore which extends longitudinally through said retaining head and said shank; and means disposed wholly within said bore and adapted to be moved in a first direction therein for locking said anchor on both sides of said members and in a second direction therein for unlocking and thereby releasing said anchor from said members, the means comprising a locking member having a central substantially cylindrical portion of approximately the same diameter as that of said bore, a first enlarged head having a lower surface and formed at one end of said central portion, and a second enlarged head, which is larger in diameter than the first and positioned within said bore at the other end of said central portion and opposite to that on which said retaining head is formed, said second enlarged head being sized to remain in its initial position within said bore as said locking member is moved towards said retaining head, thereby causing the other end of said shank to bulge outwardly, said first enlarged head being sized to be forced through said bore when said locking member is being moved towards said retaining head and to be forced entirely out of said bore in the locked position, whereby the lower surface of said first enlarged head bears on said retaining head to retain the locking member in the locked position, each of said enlarged heads having means for engagement by a tool for axially moving said locking member within said bore.

* * * * *